Figure 1:
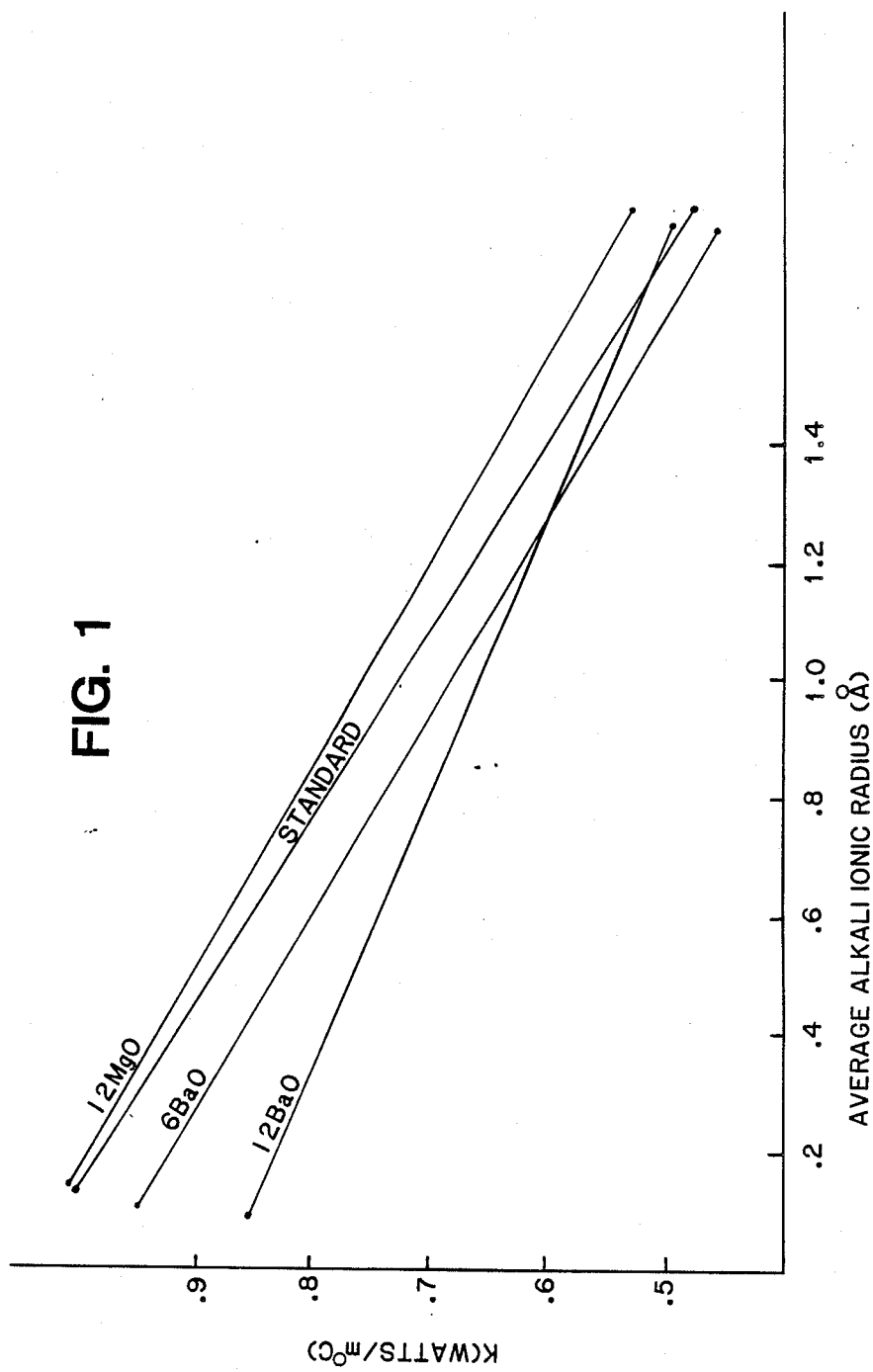

United States Patent [19]

Hayden et al.

[11] Patent Number: 4,929,387

[45] Date of Patent: May 29, 1990

[54] PHOSPHATE GLASS USEFUL IN HIGH POWER LASERS

[75] Inventors: Joseph S. Hayden, South Abington Township, Lackawana County; David L. Sapak, Avoca; Julia M. Ward, Hollidaysburg, all of Pa.

[73] Assignee: Schott Glass Technologies, Inc., Duryea, Pa.

[21] Appl. No.: 331,782

[22] Filed: Apr. 3, 1989

Related U.S. Application Data

[63] Continuation-in-part of Ser. No. 238,437, Aug. 31, 1988, abandoned.

[51] Int. Cl.$^5$ ............... C03C 3/16; C03C 3/19; C03C 3/17; C03C 3/062
[52] U.S. Cl. .................. 252/301.4 P; 252/301.6 P; 501/45; 501/47; 501/48; 501/73; 501/78
[58] Field of Search ............... 252/301.4 P, 301.6 P; 501/45, 47, 48, 73, 78

[56] References Cited

U.S. PATENT DOCUMENTS

| | | | |
|---|---|---|---|
| 3,580,859 | 5/1971 | Buzhinsky et al. | 252/301.4 P |
| 3,846,142 | 11/1974 | Buzhinsky et al. | 252/301.4 P |
| 3,979,322 | 9/1976 | Alexeev et al. | 252/301.6 P |
| 4,022,707 | 5/1977 | Deutschbein et al. | 252/301.6 P |
| 4,075,120 | 2/1978 | Myers et al. | 252/301.4 P |
| 4,076,541 | 2/1978 | Rapp | 252/301.4 P |
| 4,120,814 | 10/1978 | Izumitani et al. | 252/301.4 P |
| 4,239,645 | 12/1980 | Izumitani et al. | 252/301.6 P |
| 4,248,732 | 2/1981 | Myers et al. | 252/301.6 P |
| 4,255,459 | 3/1981 | Glen | 426/521 |
| 4,333,848 | 6/1982 | Myers et al. | 252/301.4 P |
| 4,470,922 | 9/1984 | Denker et al. | 252/301.4 P |
| 4,661,284 | 4/1987 | Cook et al. | 252/301.6 P |

FOREIGN PATENT DOCUMENTS

| | | |
|---|---|---|
| 2924684 | 1/1981 | Fed. Rep. of Germany . |
| 3340968 | 5/1984 | Fed. Rep. of Germany . |
| 3435133 | 4/1985 | Fed. Rep. of Germany . |
| 3609247 | 9/1986 | Fed. Rep. of Germany . |
| 49-114615 | of 1974 | Japan . |
| 50-3411 | of 1975 | Japan . |
| 51-30812 | of 1976 | Japan . |
| 51-59911 | of 1976 | Japan . |
| 51-107311 | of 1976 | Japan . |
| 51-107312 | of 1976 | Japan . |
| 54-38311 | of 1979 | Japan . |
| 60-191029 | of 1985 | Japan . |
| 355916 | 11/1976 | U.S.S.R. . |

OTHER PUBLICATIONS

Minami et al., "Thermal Expansion and Chemical Durability of Phosphate Glasses," *J. Am. Ceram. Soc.*, 60(5-6) 232-235 (1977).

Timdayala et al., "Lithium-Zinc-Phosphate Glasses," *Ceramic Bulletin*, 57(4) 432-433, 437 (1978).

*Primary Examiner*—Mark L. Bell
*Attorney, Agent, or Firm*—Millen, White & Zelano

[57] ABSTRACT

A low- or no-silica phosphate glass useful as a laser medium and having a high thermal conductivity, $K_{90°C.} > 0.8$ W/mK, and a low coefficient of thermal expansion, $\alpha_{20°-40°C.} < 80 \times 10^{-7}$ /°C., consists essentially of (on a batch composition basis):

| | Mole % |
|---|---|
| $P_2O_5$ | 45-70 |
| $Li_2O$ | 15-35 |
| $Na_2O$ | 0-10 |
| $Al_2O_3$ | 10-15 |
| $Nd_2O_3$ | 0.01-6 |
| $La_2O_3$ | 0-6 |
| $SiO_2$ | 0-8 |
| $B_2O_3$ | 0-8 |
| MgO | 0-18 |
| CaO | 0-15 |
| SrO | 0-9 |
| BaO | 0-9 |
| ZnO | 0-15 | the amounts of $Li_2O$ and $Na_2O$ providing an average alkali metal ionic radius sufficiently low whereby said glass has $K_{90°C.} > 0.8$ W/mK and $\alpha_{20°-40°C.} < 80 \times 10^{-7}$/°C., and wherein, when the batch composition is melted in contact with a silica-containing surface, the final glass composition contains at most about 3.5 mole % of additional silica derived from such contact during melting. The $Nd_2O_3$ can be replaced by other lasing species.

23 Claims, 3 Drawing Sheets

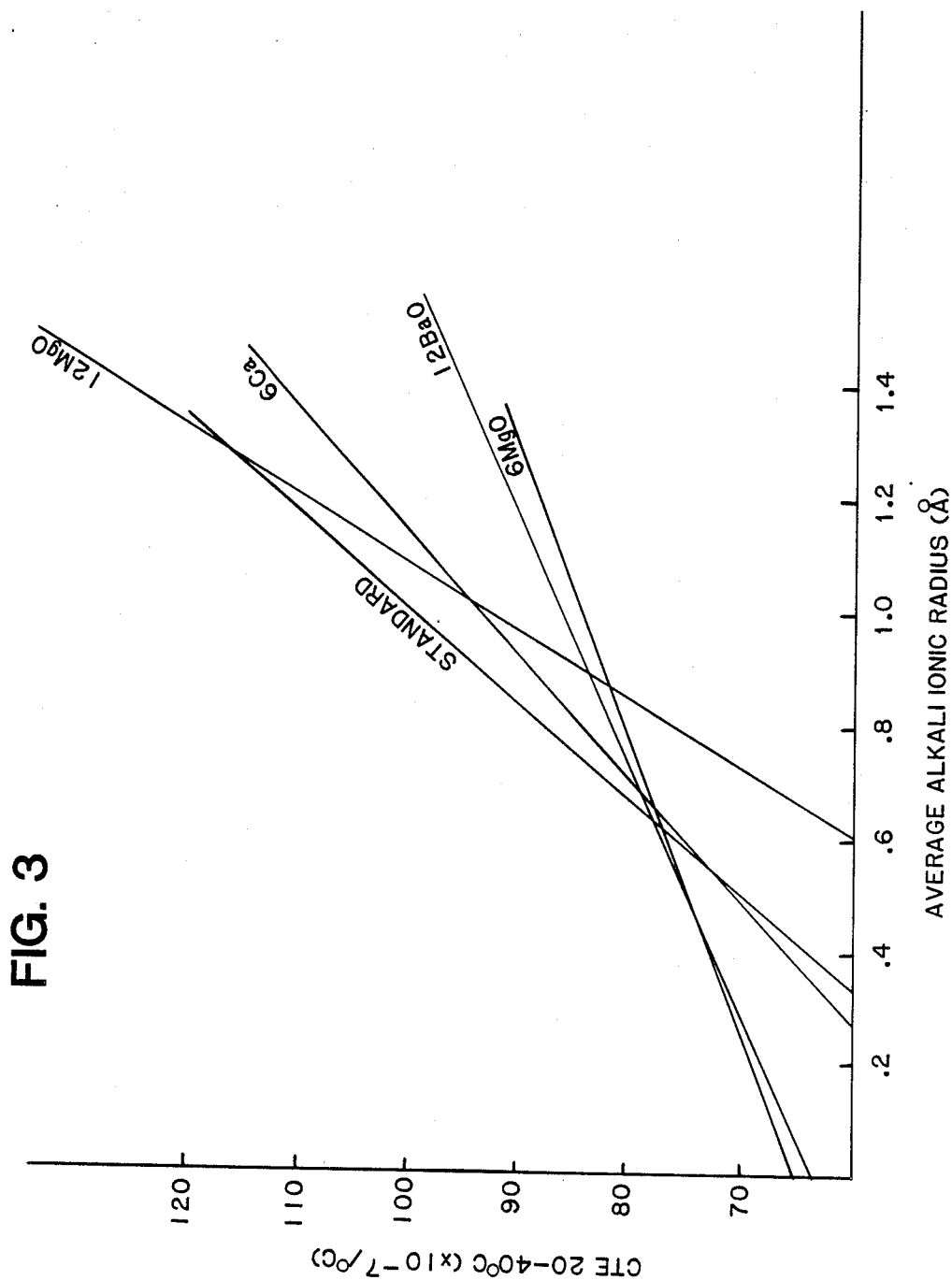

PHOSPHATE GLASS USEFUL IN HIGH POWER LASERS

The U.S. Government has rights in this invention pursuant to Contract No. W-7405-ENG-48 awarded by the U.S. Department of Energy.

This application is a continuation-in-part of U.S. Ser. No. 07/238,437 of Aug. 31, 1988, now abandoned, which is incorporated by reference herein.

BACKGROUND OF THE INVENTION

This invention relates to phosphate laser glasses, typically neodymium-doped, having high fracture toughness, good cross section for stimulated emission, and, especially, high thermal conductivity and low thermal expansion, inter alia, in comparison to prior art and commercially available phosphate laser glasses.

The term "laser" refers to the amplification of light by the stimulated emission of radiation. In a laser, a suitable active material, which can be a glass suitably doped with an active atomic species such as neodymium, is placed in a cavity resonator formed by two reflecting, or at least partially reflecting, walls.

Solid state lasers used for the generation of high levels of average power require that the active material possess a large value (e.g., >1) of the thermal-mechanical figure of merit, FOM, given by:

$$FOM = \frac{SK(1 - \nu)}{\alpha E}$$

where S is the fracture strength; K, the thermal conductivity; $\nu$, Poisson's ratio; E, Young's modulus; and $\alpha$, the thermal expansion coefficient of the material. The fracture strength is not totally an intrinsic property of the material but also depends on the physical condition of the surface of the material as well as the material's fracture toughness.

The importance of the thermal-mechanical figure of merit is clear by considering the thermal condition of a solid state laser material used in a high average power application. During operation, the laser material is exposed to intense levels of pump radiation, a fraction of which is converted by the material into laser emission. A portion of this pump radiation is absorbed by the active material itself resulting in an increase of temperature which rapidly is manifested as a drop in laser efficiency, in some cases serious enough to terminate laser action. As a consequence, it is necessary to cool the laser material by passing a liquid or gas over its surfaces; which, in turn, results in a thermal gradient as the internal temperature of the material rises higher than the temperature of its surfaces. The thermal gradient is accompanied by a stress gradient through the laser material which can be high enough to cause fracture of the active material. The thermal mechanical figure of merit is proportional to the maximum gradient that the material can tolerate without fracture.

To optimize a glass for high average power application it is thus necessary to maximize thermal conductivity and minimize the coefficient of thermal expansion, Poisson's ratio, and Young's modulus. An additional benefit of high thermal conductivity is its direct impact on lowering the internal temperature of the laser material. The effect of minimizing this temperature, for a particular level of pumping, is found both in the reduction of the stress gradient within the material and in a drop in the thermal population of the lower lasing level. This reduction in population of the lower lasing level increases the operating efficiency of the laser.

It is important in the field of high average power lasers that the active material also be characterized by high cross section for stimulated emission and long fluorescence lifetime of the excited state involved in the laser transition. Solid state laser materials are also more favorable for application in high average power laser systems if the active material can be produced in large sizes with high optical quality, high optical homogeneity, and in a form free of all inclusions which absorb radiation. The latter could develop into damage sites within the material when the laser is operated at high power levels, leading ultimately to the active element being rendered useless as a laser material. It is further desirable that the glass materials be chemically strengthenable. Of course, it is always necessary that the glass have good manufacturability properties, e.g., devitrification stability.

It is known that phosphate laser glasses have a low threshold value for the laser effect, and phosphate compositions have been commercially available for some time as materials for use in laser systems in large sizes with excellent optical quality and optical homogeneity. The quality of prior-art phosphate laser glasses recently has been extended by the introduction of new manufacturing technology capable of producing these compositions as glasses with levels of optical quality as good as that of previous glasses but which are now free of all absorbing inclusions which could develop into damage sites within the glass.

Nevertheless, a need has remained to further the development of phosphate compositions, e.g., improve even more the already-excellent thermal-mechanical properties of available phosphate laser glasses, thus making available new compositions which are more attractive for use in high average power laser systems and/or which increase the maximum tolerable power levels, while retaining the current state-of-the-art qualities which make doped phosphate glasses so useful as laser media.

Prior art phosphate glasses contain a wide variety of components including, for example, $Al_2O_3$, $SiO_2$, alkali metal oxides ($Na_2O$, $K_2O$, $Li_2O$, especially), alkaline earth metal oxides, etc., in addition to the base component $P_2O_5$. The prior art glasses having the best combination of the important thermal properties of thermal conductivity and coefficient of thermal expansion have typically been those containing necessary amounts of $SiO_2$. See, e.g., DE 3435133, JP 51-107312 and DE 3609247. These glasses typically have relatively low alumina contents.

Other phosphate laser glasses place no special emphasis on $SiO_2$ or even lack it entirely, e.g., U.S. Pat. Nos. 4,248,732, 4,075,120, 4,239,645, 4,022,707, 4,470,922, JP 51-59911, DE 2924684, and DE 3340968, etc.

Many other laser phosphate publications exist describing a wide variety of glasses such as JP Nos. 49-114,615(4), 60-191,029(3), 51-107,311, 50-3,411, 51-30,812, SU-355,916, U.S. Pat. Nos. 4,333,848, 3,846,142. In these patents, no particular emphasis is placed on alkali metal oxides. Further patents equate all the alkali metals, e.g., U.S. Pat. Nos. 4,248,732, 4,075,120, 4,120,814, 3,979,322, 4,225,459, 3,580,859 and 4,470,922. Others generically imply that lithium oxide, for example, is less preferred than the other alkali metal oxides. Such patents include U.S. Pat. Nos. 4,022,707, 4,076,541, 4,661,284 and 4,333,848. JP 54-38,311 indicates a preference for lithium but in phosphate glasses containing components such as CuO and $V_2O_5$.

SUMMARY OF THE INVENTION

It has now been discovered that phosphate glasses suitable for use in lasers, especially high average power lasers, and having a very desirable combination of thermal mechanical properties and other properties such as those mentioned above, can be achieved.

Thus, in one aspect, this invention relates to a low-or no-silica phosphate glass useful as a laser medium and having a high thermal conductivity, $K_{90° C.} > 0.8$ W/mK, and a low coefficient of thermal expansion, $\alpha_{20°-40° C.} < 80 \times 10^{-7}/°C.$, consisting essentially of:

| | Mole % | |
|---|---|---|
| | Preferred | Most Preferred |
| $P_2O_5$ | 45–70 | 50–65 | 55–65 |
| $Li_2O$ | 15–35 | 15–30 | 18–30 |
| $Na_2O$ | 0–10 | 0–5 | 0 |
| $Al_2O_3$ | 10–15 | 10–15 | 10–15 |
| $Nd_2O_3$ | 0.01–6 | 0.01–6 | 0.01–6 |
| $La_2O_3$ | 0–6 | 0–6 | 0–6 |
| $SiO_2$ | 0–8 | 0 | 0 |
| $B_2O_3$ | 0–8 | 0–5 | 0 |
| MgO | 0–18 | 0–12 | 0–9 |
| CaO | 0–15 | 0–12 | 0–9 |
| SrO | 0–9 | 0–6 | 0–4 |
| BaO | 0–9 | 0–6 | 0–4 |
| ZnO | 0–15 | 0–12 | 0–9 | the amounts of $Li_2O$ and $Na_2O$ providing an average alkali metal ionic radius sufficiently low whereby said glass has $K_{90° C.} > 0.8$ W/mK and preferably higher and $\alpha_{20°-40° C.} < 80 \times 10^{-7}/°C.$ and preferably lower, and, when used as a laser medium, an amount of a lasing species or lasing system (e.g., a lasing species/energy transfer species combination) effective for lasing, e.g., often 0.01–6 mole % in total, but optionally also higher, e.g., up to 10% or even up to 20% or higher in total, ordinarily Nd ($Nd_2O_3$), as exemplified in the table above. $La_2O_3$ can replace such species especially when they are lanthanides, as also shown in the table above.

In other preferred aspects, $K_{90° C.} \geq 0.85$ or higher and $\alpha_{20°-40° C.} \leq 77$ or lower; the content of MgO is at least 4 mole %; the glass contains essentially no alkali metal oxide other than $Li_2O$; and/or the glass contains essentially no $SiO_2$.

In another preferred aspect, the glass also has the following important properties:

| | |
|---|---|
| Damaging inclusions per liter | essentially zero |
| Strengthenability | $\geq 4 \times$ |
| Young's Modulus (E) | $< 72 \times 10^3$ N/mm$^2$ |
| Poisson's Ratio ($\nu$) | $< 0.230$ |
| Cross section ($\sigma$) | $> 3.5 \times 10^{-20}$ cm$^2$ |
| Fluorescence lifetime (5% Nd) | $> 250$ μsec |

It is further preferred that these properties exceed even these goals, e.g., $E \leq 70$, sigma $> 4.0$ or 4.1, lifetime $> 270$ or 290.

In a patentably distinct invention of a subentity of inventors, there has been achieved a low- or no-silica phosphate glass useful as a laser medium and having a high thermal conductivity, $K_{90° C.} > 0.8$ W/mK, and a low coefficient of thermal expansion, $\alpha_{20°-40° C.} < 80 \times 10^{-7}/°C.$, consisting essentially of:

| | Mole % | |
|---|---|---|
| | Preferred | Most Preferred |
| $P_2O_5$ | 45–70 | 50–65 | 55–65 |
| $Li_2O$ | 3–35 | 15–30 | 18–30 |
| $Na_2O$ | 0–10 | 0–5 | 0 |
| $Al_2O_3$ | 10–15 | 10–15 | 10–15 |
| $Nd_2O_3$ | 0.01–6 | 0.01–6 | 0.01–6 |
| $La_2O_3$ | 0–6 | 0–6 | 0–6 |
| $SiO_2$ | 0–8 | 0 | 0 |
| $B_2O_3$ | 0–8 | 0–5 | 0 |
| MgO | 4–18 | 4–15 | 4–9 |
| CaO | 0–15 | 0–12 | 0–9 |
| SrO | 0–9 | 0–6 | 0–4 |
| BaO | 0–9 | 0–6 | 0–4 |
| ZnO | 0–15 | 0–12 | 0–9 | the amounts of $Li_2O$ and $Na_2O$ providing an average alkali metal ionic radius sufficiently low whereby said glass has $K_{90° C.} > 0.8$ W/mK and preferably higher and $\alpha_{20°-40° C.} < 80 \times 10^{-7}/°C.$ and preferably lower, and, when used as a laser medium, an amount of a lasing species or lasing system (e.g., a lasing species/energy transfer species combination) effective for lasing, e.g., often 0.01–6 mole % in total, but optionally also higher, e.g., up to 10% or even up to 20% or higher in total, ordinarily Nd ($Nd_2O_3$), as exemplified in the table above. $La_2O_3$ can replace such species especially when they are lanthanides, as also shown in the table above.

Figure 2:
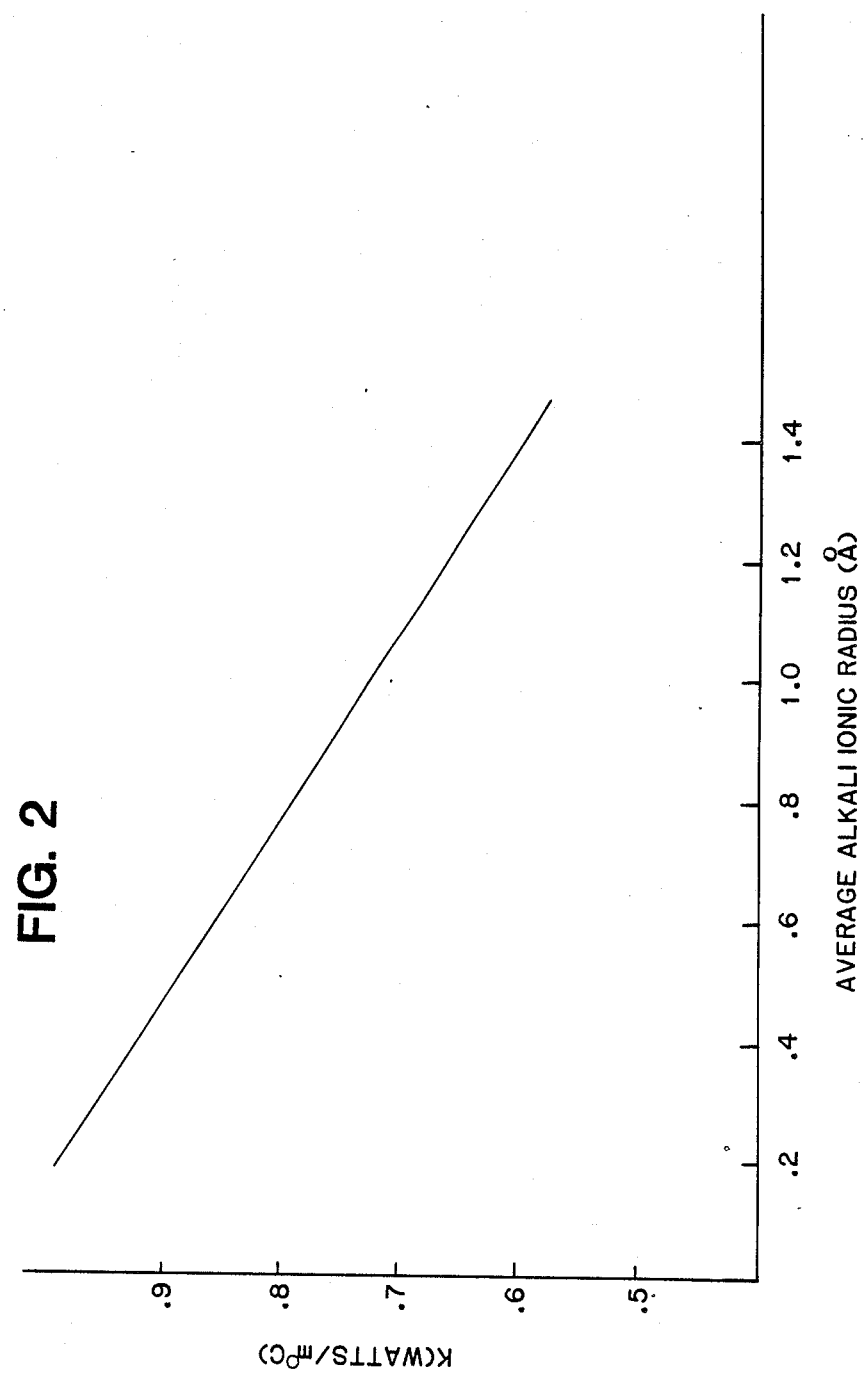

Various other objects, features and attendant advantages of the present invention will be more fully appreciated as the same becomes better understood when considered in conjunction with the following discussion and the accompanying drawings wherein:

FIG. 1 shows the functional dependence of thermal conductivity, K, versus average alkali metal ionic radius, wherein "standard" refers to the curve achieved by varying relative alkali content in the base composition of Example 1 and the labels on the other curves refer to the results of relative alkali content changes in base compositions wherein the recited oxide is substituted for the respective amount of $Li_2O$ in the composition of Example 1;

FIG. 2 shows the functional dependence of thermal conductivity, K, versus average alkali ionic radius for the base composition of Example 1; and FIG. 3 shows the functional dependence of the coefficient of thermal expansion (20°–40° C.), $\times 10^{-7}/°C.$, versus average alkali metal ionic radius, wherein the curve labels are analogous to those defined for FIG. 1.

Special emphasis in this invention is placed on thermal conductivity $> 0.8$ W/mK and thermal expansion from 20° C. to 40° C. $< 80 \times 10^{-7}/°C.$ The properties of Young's modulus and Poisson's ratio are, in general, not strongly affected by the compositional variations within the scope of this invention. The compositions of the invention further are compatible with current melting technology, thus assuring that the glasses of this invention will be produced with excellent optical and inclusion qualities.

The cross sections for stimulated emission and the fluorescence lifetime of the excited state involved in the laser transition, are also superior for the glasses of this invention. The precise values for a given glass, however, are not uniquely critical for application as a high average power laser material. The thermal expansion across the temperature range of 20° C. to 300° C., the refractive index at 587.5618 nm, the specific gravity and the glass transformation temperature of the compositions of this invention furthermore are highly satisfactory.

These glass compositions employing $P_2O_5$ as the principal glass former, in comparison to $SiO_2$, also advantageously provide laser glasses characterized by lower non-linear refractive index, higher laser gain, and a negative or near zero value for the temperature dependence of refractive index. This latter property denotes to the glasses an overall value of temperature coefficient of optical path length near zero. The glasses thus can be described as essentially athermal.

The alkali metal content and identity are particularly of high importance to this invention. In particular, the presence of lithium is critical to meeting the thermal parameters necessary for high average power requirements. Small additions of sodium are generally tolerable. The amount of sodium acceptable will vary somewhat as a function of the base composition. Lesser amounts of potassium will also be acceptable in the glasses, in general, less than about, e.g., 3 mole % $K_2O$, as for $Na_2O$, consistent with producing a glass with the mentioned desirable thermal-mechanical and other properties for high average power applications. Examples 37–42 (Table 12) demonstrate further the effect of alkali metal variations in the base glass composition of Example 1.

The data of FIGS. 1-3 demonstrate the effect of average alkali metal ionic radius on the important properties of thermal conductivity and thermal expansion. Average alkali ionic radius is defined as the mole % weighted average of the sum of the ionic radii of the alkali metals contained in a given glass composition. The ionic radii ions are as follows: Li - 0.66Å, Na - 0.95Å, K - 1.33Å.

As can be seen from FIGS. 1 and 2, for the base composition of Example 1, the value of thermal conductivity of 0.8 W/mK cannot be achieved for average alkali ionic radii greater than about 0.75Å. This alone shows the high preference of this invention for large contents of the smallest alkali metal, lithium, over sodium and especially over potassium and the even larger alkali metal ions; most preferably, lithium is the only alkali metal in the glasses.

However, there is no well defined upper limit on the average alkali ionic radius which is permissible in this invention because of the wide variations possible in the base glass compositions. As shown in FIG. 1, for example, additions of alkaline earth metal ions, especially magnesium oxide, can increase the maximum tolerable average alkali ionic radius. On the other hand, some additions will decrease this maximum tolerable radius as also shown in FIG. 1 for thermal conductivity. FIG. 3 demonstrates the same effect of base glass composition (in particular, based on variations in alkaline earth metal content) on the upper limit of average alkali ionic radius permissible for achievement of the maximum value of thermal expansion mentioned above ($<80\times10^{-7}/°C.$). Other variations in the base glass compositions will have more or less dramatic effects on the permissible average alkali ionic radius consistent with achievement of the necessary thermal expansion and thermal conductivity properties, as well as other desirable properties.

The effect of increasing concentration of sodium is demonstrated, for example, in Examples 1-4 (Table 1) for the preferred base glass composition of Example 1. Effects on this same base glass composition derived from other variations are shown in Examples 5-7 for potassium (Table 2), and Examples 9-12 (Table 4) for sodium substitutions with increasing total alkali metal content. These data further demonstrate and provide guidance as to how alkali metal content affects the important properties of the glasses of this invention. The limits (upper or lower) on $Na_2O$ contents, of course, can also be different from those recited above, e.g., 9, 8, 7, 6, 4, 3, 2 or 1 mole %. For $K_2O$, 2 and 1 mole % are also possible. For $Li_2O$, 4, 5, 6, 7, 8, 9, 10, 11, 12, 13, 14, 16, 17, 18, 19, 20, 21, 22, 23, 24, 25, 26, 27, 28 and 29 are also possible.

Although MgO and/or CaO, SrO, BaO and ZnO are not required per this invention to produce a glass suitable as a high average power laser material, it is nevertheless desirable to add these oxides to improve the properties of the compositions while still retaining those properties desirable in a high average power laser material. For example, the addition of small amounts of alkaline earth metal oxides improves the chemical durability and imparts to the glass a higher stability against crystallization during manufacturing.

Furthermore, as mentioned, addition of certain alkaline earth metal oxides can increase the tolerability of the composition of this invention to higher average alkali ionic radii, i.e., to higher contents of sodium oxide and/or lower contents of lithium oxide. This effect is most noticeable and beneficial for MgO additions. This can readily be seen from the Figures discussed above. It is also especially clear from the data of Examples 14-17 compared with that of Example 1 (Table 6). These results show that the combinations of thermal conductivity and thermal expansion provided by increasing MgO contents are especially advantageous. The ability of MgO to impart such optimum combinations enables higher average alkali ionic radii to be employed. Thus, an especially unique and preferred feature of the compositions of this invention is provided when magnesium contents are included. In such cases, other limits can also be, e.g., 1, 2, 3, 5, 7, 9, 11, 13, 17 mole %, etc., for MgO contents.

Regarding the patentably distinct invention described above, wherein $Li_2O$ is 3–35 mole % and MgO is 4–18 mole %, the discussion of the effect of other components given herein is also generally applicable. However, the necessary MgO content in this invention alleviates the 15% content minimum for $Li_2O$. Generally in this glass space, the total of MgO and $Li_2O$ will be about 15 mole % or higher and it is even possible for $Li_2O$ to be essentially absent. It is further possible for the amounts of $Na_2O$ and $SiO_2$, for example, to have other limits analogous to the alternate limits discussed herein for these components.

The characteristics imparted to the compositions of this invention by calcium and zinc additions are demonstrated in Examples 18–22 (Table 7) and 29–36 (Tables 10 and 11). Results similar to those discussed above for magnesium are achieved, but the effect is not as dramatic. Consequently, the maximum tolerable amounts of zinc and calcium are not as high in general.

Barium and strontium additions (as shown in Examples 23–25 (Table 8) and 26–28 (Table 9), respectively) are usually not as beneficial as those of magnesium, calcium and/or zinc. In fact, at certain higher levels, the effects of these additions are detrimental. Thus, the upper limits on the contents of these alkaline earth metal ions are lower than for the other divalent ions discussed above.

Minimum contents for these RO compounds, as well as those for the other optional components of the glasses of this invention are, e.g., 1, 2, 3, 4, 5 mole %, etc.

Without intending to limit the scope of this invention in any fashion, it is believed that the effect of Mg, Ca, Zn, Ba and Sr is correlated with the cation field strength of each in comparison with that for the alkali metal ion included in the composition, especially $Li_2O$. Cation field strengths are well-known properties for these ions and discussed in conventional publications such as *Chemical Approach to Glass*, Volf, Elsevier (1984). Thus, without intending to limit the scope of this invention in any way, it is theorized that the relatively large cation field strength for Mg (0.48) has a beneficial effect on the compositions by compensating for the relatively low cation field strength of lithium (0.27). The beneficial effects of the ions of zinc, calcium, barium and strontium are significantly lower since the cation field strengths of these ions are relatively lower than for magnesium, e.g., 0.36 for calcium, 0.27 for barium, 0.45 for zinc, and 0.32 for strontium.

$Al_2O_3$ is also a particularly important component. It imparts to the resultant glass better chemical durability. Levels of $Al_2O_3$ higher than 15 mole % tend to have an undesirable effect on cross section. Values lower than 10% for this invention are particularly unacceptable, not only because of resultant insufficient chemical durability, but also because of often severe adverse effects on thermal properties, e.g., thermal expansion and other properties. Other limits of $Al_2O_3$ contents are, e.g., 11, 12, 13 or 14 mole %.

The addition of $SiO_2$, while not required, can raise the thermal conductivity of the resultant glass without strongly influencing thermal expansion. However, the addition of $SiO_2$ makes the glass more prone to crystallization and decreases fluorescence lifetime and cross section. Furthermore, the presence of silica in a glass melt is known to lower the solubility of ionic platinum in such melts, leading to incorporation of platinum particles from state-of-the-art melters into the resultant glass. These particles (inclusions) absorb laser radiation and can become damage sites within the element, potentially rendering the material useless as a high quality optical element. Thus, the ability of this invention to achieve its excellent thermal, mechanical and optical properties without necessary $SiO_2$ contents is a major advantage. Other limits of $SiO_2$ contents are, e.g., 7, 6, 5, 4, 3, 2, 1 mole %, etc.

Minor additions of $B_2O_3$ have been found to increase slightly the thermal conductivity of the glasses; however, at levels above about 8 mole % additional $B_2O_3$ results in an unacceptable increase in thermal expansion coefficient. Other limits include 7, 6, 5 mole %, etc.

$Nd_2O_3$, the preferred lasing species, is added to the glasses in sufficient quantity to achieve the desired lasing activity as is true for the other lasing species and systems. At too high levels of $Nd_2O_3$ concentration and other species concentration, quenching of the fluorescence emission can occur, and there is a corresponding drop in fluorescence lifetime of the excited state involved in the laser transition. Suitable upper limits in a given case can be routinely determined.

Any conventional glass lasing species can be used, e.g., Nd, Tm, Yb, Dy, Pm, Tb, Er, Ho, Ti, V, Cr, Eu, Sm etc. In another embodiment of the present invention the laser compositions can contain suitable co-dopants in an amount effective to transfer energy to the primary lasing ions. These include transition metals like chromium and vanadium, or lanthanide ions, such as thulium and erbium. These have broad and intense absorption bands and resultant co-dopant fluorescence bands which overlap with the primary lasing ion absorption levels. See, e.g., *Physics of Laser Fusion*, Volume IV, "The Future Development of High-Power Solid State Laser Systems." This phenomenon leads to a more efficient conversion of pump radiation into the excited state population of lasing ions.

The total amount of these active ions alone or in combination is 0.01–6 mole % typically. However, as noted above, higher amounts can be used where appropriate, e.g., 7, 8, 9, 10, 11, 12, 13, 14, 15, 17, 25 mole %, etc. Emmett et al., Lawrence Livermore National Laboratory, UCRL-53344, Nov. 1982.

Addition of $La_2O_3$ allows direct substitution of $Nd_2O_3$ or other lasing or energy transfer lanthanide species by another lanthanide oxide, which is nearly an exact structural replacement in the case of $Nd_2O_3$. This allows the manufactured glass to be produced with a broad range of neodymium or other lasing species doping levels while minimizing the change from this adjustment on the physical, thermal, and optical properties of the produced glasses. Thus, $La_2O_3$ amounts typically are 0.01–6 mole %, but higher contents are possible, e.g., up to 10% or even up to 20% as a replacement for lanthanide lasing species.

It is further possible to add small amounts, e.g., 0.1–0.3 wt. %, of conventional refining agents such as $As_2O_3$ and $Sb_2O_3$ to the compositions to aid in manufacturing while not compromising high average power properties. It is additionally possible to add small antisolarization effective amounts, e.g., 0.1–1.5 wt. %, of conventional antisolarants such as $TiO_2$, $CeO_2$ and $Nb_2O_5$ (as well as others, e.g., $SiO_2$ and $Sb_2O_3$) to suppress solarization of these glasses during exposure to intense UV radiation, common during application as an active laser material. It is further possible to omit a lasing species entirely in the glasses, e.g., for their use in other applications, e.g., in optical elements such as lenses, mirrors, etc., where their exceptional properties are beneficial.

A further advantage of the glasses of this invention is their compatibility with current state-of-the-art manufacturing methods for phosphate laser glasses. The melting, refining, homogenizing and casting of these glasses can be accomplished using the current standard procedures employed by the glass industry. The highly thermal stress resistant glasses of this invention can be formed into slabs, rods, discs, and other shapes required by the laser community and others by conventional forming techniques well known in the glass industry. The resultant glasses are of high fracture toughness, high thermal conductivity, low thermal expansion, good cross section for stimulated emission, good fluorescence lifetime for excited state emission, and high optical quality and optical homogeneity even in large sizes of as much as 15 to 20 liters of produced glass, and are free of all inclusions which can absorb or scatter laser radiation. Optical elements of these glasses can thus be fabricated utilizing standard procedures for cutting, grinding and polishing optical glass.

The glasses are also very amenable to conventional chemical strengthening because of the presence therein of significant amounts of smaller alkali metals, typically Li but also Na in accordance with the foregoing. When sodium or lithium are present in a glass at levels greater than about 6 wt. %, chemical strengthening of resultant glass articles is possible by a fully conventional procedure known as ion exchange. In this procedure, a surface compression layer is created over the glass article in such a way that to fracture the glass article a tensile force greater than the sum of the original failure strength plus the extra surface compression from chemical strengthening must be exceeded. In this way the strengthened glass articles can be operated under conditions of higher thermal loading without component failure.

The glasses of this invention can be fully conventionally prepared by mixing the appropriate amounts of each constituent in a batch which is then charged into a fused silica crucible and melted by induction heating from, e.g., 1100° C. to as much as 1500° C. depending on the chosen composition. The glass can then be refined at temperatures exceeding, e.g., 1300° C. from typically 2 to 4 hours, again depending on composition and thus melt viscosity, with equal intervals of gas bubbling and stirring. The glass typically is then cast into steel molds and annealed at the transformation temperature plus about 20° C. for about 2 hours, followed by cooling at about 30° C./hour. These procedures were followed in the examples below.

As noted above, the examples of this application are melted in a fused silica crucible. Under such melting conditions, as is well known, there will be some silica added from the crucible to the final glass composition. Accordingly, whereas all compositions given in this disclosure refer to component contents as added to the batch as is conventional (batch compositions), where a fused silica crucible is employed, the final composition will contain some silica. This conventional difference from the initial batch composition is analogous to other differences between final glass compositions and batch compositions, e.g., due to volatilization of ingredients, etc. For this invention, the additional amount of silica over and above the amount included in the batch composition will typically be no more than about 3.5, 3, 2.5, 2, 1.5, 1, 0.5 mole %, etc., especially not more than about 3 mole %, and most especially not more than about 2 mole % (all on a renormalized basis). In a preferred aspect of this invention, there is no silica added to the batch composition and the final composition contains no more than 3 mole % silica, especially not more than 2 or 1 mole % silica (on the mentioned basis) due to the effect of silica melting from the crucible. Of course, where a nonsilica-containing crucible is employed, this effect will not occur. The silica contribution from the crucible will vary conventionally with melt temperature and melting time. For example, for a melt time of about 2 hours at a temperature of about 1300° C., about 2 wt % of silica will be contributed from a quartz crucible, the precise amount being determined by the precise conditions involved, such as glass volume exposed, crucible surface area, glass composition, degree of agitation of the melt, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, cited above and below, are hereby incorporated by reference.

EXAMPLES

It will be noted that several of the examples achieve properties falling outside the scope of this invention. These examples thus demonstrate the importance of certain factors discussed above in achieving the properties of this invention and, most importantly, provide valuable guidance as to how routine experimentation may be utilized to select compositions within the general composition space defined for this invention which have the properties defined for this invention. Fully conventional consideration will of course be given by skilled workers in any study of these examples to the experimental errors involved in measuring the disclosed properties, e.g., ±4% for K and ±7% for α.

TABLE 1

Sodium Substitutions for Lithium
(Compositions in Mole Percent Oxide)

| Oxide | 1 | 2 | 3 | 4 |
|---|---|---|---|---|
| $P_2O_5$ | 61.27 | 61.27 | 61.27 | 61.27 |
| $Al_2O_3$ | 11.83 | 11.83 | 11.83 | 11.83 |
| $Li_2O$ | 24.59 | 18.59 | 15.59 | 17.59 |
| $Na_2O$ |  | 6.00 | 9.00 | 7.00 |
| $Nd_2O_3$ | 1.70 | 1.74 | 1.74 | 1.74 |
| $La_2O_3$ | 0.35 | 0.36 | 0.36 | 0.36 |
| $As_2O_3$ | 0.12 | 0.12 | 0.12 | 0.12 |
|  | Base Melt |  |  |  |
| Properties |  |  |  |  |
| nd | 1.533 | 1.5316 | 1.5305 | 1.5313 |
| sigma | 4.23 | 4.27 | 4.24 | 4.24 |
| lifetime | 292 | 315 | 318 | 320 |
| density | 2.62 | 2.64 | 2.64 | 2.66 |
| K | 0.85 | 0.80 | 0.79 | 0.80 |
| CTE 20-300° C. | 98.4 | 106.2 | 108.3 | 111.8 |
| CTE 20-40° C. | 76.5 | 71.4 | 83.4 | 85.1 |
| E | 70 | 71 | 72 | 71 |

TABLE 2

Potassium Substitution for Lithium
(Compositions in Mole Percent Oxide)

| Oxide | 1 | 5 | 6 | 7 |
|---|---|---|---|---|
| $P_2O_5$ | 61.27 | 61.27 | 61.27 | 61.27 |
| $Al_2O_3$ | 11.83 | 11.83 | 11.83 | 11.83 |
| $Li_2O$ | 24.59 | 18.59 | 15.59 | 21.59 |
| $K_2O$ |  | 6.00 | 9.00 | 3.00 |
| $Nd_2O_3$ | 1.70 | 1.74 | 1.74 | 1.74 |
| $La_2O_3$ | 0.35 | 0.36 | 0.36 | 0.36 |
| $As_2O_3$ | 0.12 | 0.12 | 0.12 | 0.12 |
| Comments: | Base Melt |  |  |  |
| Properties |  |  |  |  |
| nd | 1.533 | 1.5291 | 1.5263 | 1.5315 |
| sigma | 4.23 | 4.18 | 4.15 | 4.22 |
| lifetime | 292 | 329 | 330 | 303 |
| density | 2.62 | 2.64 | 2.64 | 2.64 |
| K | 0.85 | 0.77 | 0.74 | 0.79 |
| CTE 20-300° C. | 98.4 | 106.0 | 109.3 | 105.0 |
| CTE 20-40° C. | 76.5 | 88.3 | 84.0 | 83.2 |
| E | 70 | 68 | 65 | 70 |

TABLE 3

Lead Substitution for Phosphorous
(Compositions in Mole Percent Oxide)

| Oxide | 1 | 8 |
|---|---|---|
| $P_2O_5$ | 61.27 | 55.27 |

TABLE 3-continued

Lead Substitution for Phosphorous
(Compositions in Mole Percent Oxide)

| Oxide | 1 | 8 |
|---|---|---|
| $Al_2O_3$ | 11.83 | 11.83 |
| $Li_2O$ | 24.59 | 24.59 |
| CaO | | |
| PbO | | 6.00 |
| $Nd_2O_3$ | 1.70 | 1.74 |
| $La_2O_3$ | 0.35 | 0.36 |
| $As_2O_3$ | 0.12 | 0.12 |
| Comments: | Base Melt | Index Study |
| Properties | | |
| nd | 1.533 | 1.5620 |
| sigma | 4.23 | 4.28 |
| lifetime | 292 | 242 |
| density | 2.62 | 2.90 |
| K | 0.85 | 0.79 |
| CTE 20–300° C. | 98.4 | 103.0 |
| CTE 20–40° C. | 76.5 | 83.2 |
| E | 70 | 72 |

TABLE 4

Sodium Substitutions for Lithium
Increased Total Alkali Content
(Compositions in Mole Percent Oxide)

| Oxide | 1 | 9 | 10 | 11 | 12 |
|---|---|---|---|---|---|
| $P_2O_5$ | 61.27 | 59.21 | 57.15 | 57.15 | 59.21 |
| $Al_2O_3$ | 11.83 | 11.43 | 11.03 | 11.03 | 11.43 |
| $Li_2O$ | 24.59 | 27.05 | 29.51 | 23.51 | 18.05 |
| $Na_2O$ | | | | 6.00 | 9.00 |
| $Nd_2O_3$ | 1.70 | 1.74 | 1.74 | 1.74 | 1.74 |
| $La_2O_3$ | 0.35 | 0.36 | 0.36 | 0.36 | 0.36 |
| $As_2O_3$ | 0.12 | 0.12 | 0.12 | 0.12 | 0.12 |
| Comments: | Base Melt | | | | |
| Properties | | | | | |
| nd | 1.533 | 1.5335 | 1.5355 | 1.5346 | 1.5321 |
| sigma | 4.23 | 4.25 | 4.29 | 4.32 | |
| lifetime | 292 | 273 | 248 | 270 | 248 |
| density | 2.62 | 2.63 | 2.63 | 2.66 | 2.67 |
| K | 0.85 | 0.82 | 0.83 | 0.82 | 0.79 |
| CTE 20–300° C. | 98.4 | 103.4 | 104.2 | 110.7 | 112.7 |
| CTE 20–40° C. | 76.5 | 76.0 | 72.9 | 81.1 | 93.2 |
| E | 70 | 70 | 70 | 72 | 71 |

TABLE 5

$B_2O_3$ Addition
(Compositions in Mole Percent Oxide)

| Oxide | 1 | 13 |
|---|---|---|
| $P_2O_5$ | 61.27 | 56.27 |
| $Al_2O_3$ | 11.83 | 11.83 |
| $Li_2O$ | 24.59 | 24.59 |
| $B_2O_3$ | | 5.00 |
| $Nd_2O_3$ | 1.70 | 1.74 |
| $La_2O_3$ | 0.35 | 0.36 |
| $As_2O_3$ | 0.12 | 0.12 |
| Comments: | Base Melt | |
| Properties | | |
| nd | 1.533 | 1.5339 |
| sigma | 4.23 | 4.11 |
| lifetime | 292 | 266 |
| density | 2.62 | 2.62 |
| K | 0.85 | 0.85 |
| CTE 20–300° C. | 98.4 | 96.2 |
| CTE 20–40° C. | 76.5 | 74.1 |
| E | 70 | 70 |

TABLE 6

Magnesium Substitution for Lithium
(compositions in mole percent)

| Oxide/Melt # | 1 | 14 | 15 | 16 | 17 |
|---|---|---|---|---|---|
| $P_2O_5$ | 61.27 | 61.27 | 61.27 | 61.27 | 61.27 |
| $Al_2O_3$ | 11.83 | 11.83 | 11.83 | 11.83 | 11.83 |
| $Li_2O$ | 24.59 | 18.59 | 15.59 | 12.59 | 9.59 |
| MgO | | 6.00 | 9.00 | 12.00 | 15.00 |
| $Nd_2O_3$ | 1.70 | 1.74 | 1.74 | 1.74 | 1.74 |
| $La_2O_3$ | 0.35 | 0.36 | 0.36 | 0.36 | 0.36 |
| $As_2O_3$ | 0.12 | 0.12 | 0.12 | 0.12 | 0.12 |
| Comments: | Base Melt | | | | |
| Properties: | | | | | |
| $n_d$ | 1.533 | 1.533 | 1.542 | 1.530 | 1.527 |
| Sigma | 4.23 | 4.10 | 4.01 | 4.02 | 3.95 |
| lifetime | 292 | 302 | 275 | 271 | 276 |
| density | 2.62 | 2.63 | 2.64 | 2.64 | 2.63 |
| K | 0.85 | 0.86 | 0.87 | 0.87 | 0.87 |
| CTE 20–40° C. | 76.5 | 77.1 | 73.2 | 69.6 | 59.8 |
| CTE 20–300° C. | 98.4 | 92.3 | 86.5 | | 76.9 |
| E | 70 | 73 | 74 | 73 | 73 |

TABLE 7

Calcium Substitution for Lithium
(compositions in mole percent)

| Oxide/Melt # | 1 | 18 | 19 | 20 | 21 | 22 |
|---|---|---|---|---|---|---|
| $P_2O_5$ | 61.27 | 61.27 | 61.27 | 61.27 | 61.27 | 61.27 |
| $Al_2O_3$ | 11.83 | 11.83 | 11.83 | 11.83 | 11.83 | 11.83 |
| $Li_2O_3$ | 24.59 | 21.59 | 18.59 | 15.59 | 12.59 | 9.59 |
| CaO | | 3.00 | 6.00 | 9.00 | 12.00 | 15.00 |
| $Nd_2O_3$ | 1.70 | 1.74 | 1.74 | 1.74 | 1.74 | 1.74 |
| $La_2O_3$ | 0.35 | 0.36 | 0.36 | 0.36 | 0.36 | 0.36 |
| $As_2O_3$ | 0.12 | 0.12 | 0.12 | 0.12 | 0.12 | 0.12 |
| Comments: | Base Melt | | | | | |
| Properties: | | | | | | |
| $n_d$ | 1.533 | 1.535 | 1.536 | 1.537 | 1.537 | 1.537 |
| Sigma | 4.23 | 4.17 | 4.11 | 4.08 | 4.05 | 3.99 |
| lifetime | 292 | 285 | 285 | 261 | 300 | 250 |
| density | 2.62 | 2.64 | 2.65 | 2.66 | 2.67 | 2.66 |
| K | 0.85 | 0.82 | 0.82 | 0.82 | 0.83 | 0.80 |
| CTE 20–40° C. | 76.5 | 76.1 | 76.2 | 69.2 | 65.6 | 67.6 |
| CTE 20–300° C. | 98.4 | 96.3 | 93.3 | 90.5 | 87.0 | 84.0 |
| E | 70 | 70 | 71 | 71 | 71 | 70 |

TABLE 8

Strontium Substitution for Lithium
(compositions in mole percent)

| Oxide/Melt # | 1 | 23 | 24 | 25 |
|---|---|---|---|---|
| $P_2O_5$ | 61.27 | 61.27 | 61.27 | 61.27 |
| $Al_2O_3$ | 11.83 | 11.83 | 11.83 | 11.83 |
| $Li_2O$ | 24.59 | 18.59 | 15.59 | 12.59 |
| SrO | | 6.00 | 9.00 | 12.00 |
| $Nd_2O_3$ | 1.70 | 1.74 | 1.74 | 1.74 |
| $La_2O_3$ | 0.35 | 0.36 | 0.36 | 0.36 |
| $As_2O_3$ | 0.12 | 0.12 | 0.12 | 0.12 |
| Comments: | Base Melt | | | |
| Properties: | | | | |
| $n_d$ | 1.533 | 1.538 | 1.540 | 1.549 |
| Sigma | 4.23 | 4.14 | 4.14 | 4.10 |
| lifetime | 292 | 270 | 295 | 278 |
| density | 2.62 | 2.73 | 2.75 | 2.80 |
| K | 0.85 | 0.82 | 0.79 | 0.78 |
| CTE 20–40° C. | 76.5 | 76.2 | 78.0 | 76.9 |
| CTE 20–300° C. | 98.4 | 94.2 | 92.7 | 90.1 |
| E | 70 | 71 | 71 | 70 |

TABLE 9

Barium Substitution for Lithium
(compositions in mole percent)

| Oxide/Melt # | 1 | 26 | 27 | 28 |
|---|---|---|---|---|
| $P_2O_5$ | 61.27 | 61.27 | 61.27 | 61.27 |
| $Al_2O_3$ | 11.83 | 11.83 | 11.83 | 11.83 |
| $Li_2O$ | 24.59 | 18.59 | 15.59 | 12.59 |
| BaO |  | 6.00 | 9.00 | 12.00 |
| $Nd_2O_3$ | 1.70 | 1.74 | 1.74 | 1.74 |
| $La_2O_3$ | 0.35 | 0.36 | 0.36 | 0.36 |
| $As_2O_3$ | 0.12 | 0.12 | 0.12 | 0.12 |
| Comments: | Base Melt |  |  |  |
| Properties: |  |  |  |  |
| $n_d$ | 1.533 | 1.542 | 1.546 | 1.542 |
| Sigma | 4.23 | 4.19 | 4.18 | 4.10 |
| lifetime | 292 | 262 | 302 | 282 |
| density | 2.62 | 2.78 | 2.84 | 2.90 |
| K | 0.85 | 0.80 | 0.78 | 0.74 |
| CTE 20–40° C. | 76.5 | 76.0 | 74.9 | 77.0 |
| CTE 20–300° C. | 98.4 | 95.5 | 94.2 |  |
| E | 70 | 70 | 69 | 68 |

TABLE 10

Zinc Substitution for Lithium
(compositions in mole percent)

| Oxide/Melt # | 1 | 29 | 30 | 31 | 32 |
|---|---|---|---|---|---|
| $P_2O_5$ | 61.27 | 61.27 | 61.27 | 61.27 | 61.27 |
| $Al_2O_3$ | 11.83 | 11.83 | 11.83 | 11.83 | 11.83 |
| $Li_2O$ | 24.59 | 18.59 | 15.59 | 9.59 | 6.59 |
| ZnO |  | 6.00 | 9.00 | 15.00 | 18.00 |
| $Nd_2O_3$ | 1.70 | 1.74 | 1.74 | 1.74 | 1.74 |
| $La_2O_3$ | 0.35 | 0.36 | 0.36 | 0.36 | 0.36 |
| $As_2O_3$ | 0.12 | 0.12 | 0.12 | 0.12 | 0.12 |
| Comments: | Base Melt |  |  |  |  |
| Properties: |  |  |  |  |  |
| $n_d$ | 1.533 | 1.537 | 1.537 | 1.538 | 1.537 |
| Sigma | 4.23 | 4.05 | 4.11 | 4.04 | 3.95 |
| lifetime | 292 | 262 | 272 | 280 | 272 |
| density | 2.62 | 2.7 | 2.71 | 2.77 | 2.79 |
| K | 0.85 | 0.85 | 0.83 | 0.80 | 0.77 |
| CTE 20–40° C. | 76.5 | 76.7 | 68.6 | 63.3 | 55.5 |
| CTE 20–300° C. | 98.4 | 90.7 | 85.6 |  | 73.4 |
| E | 70 | 71 | 72 | 69 | 68 |

TABLE 11

Zinc Substitution for Lithium
(compositions in mole percent)

| Oxide/Melt # | 1 | 33 | 34 | 35 | 36 |
|---|---|---|---|---|---|
| $P_2O_5$ | 61.27 | 59.21 | 59.21 | 57.15 | 57.15 |
| $Al_2O_3$ | 11.83 | 11.43 | 11.43 | 11.03 | 11.03 |
| $Li_2O$ | 24.59 | 27.05 | 15.05 | 29.51 | 17.51 |
| ZnO |  |  | 12.00 |  | 12.00 |
| $Nd_2O_3$ | 1.70 | 1.74 | 1.74 | 1.74 | 1.74 |
| $La_2O_3$ | 0.35 | 0.36 | 0.36 | 0.36 | 0.36 |
| $As_2O_3$ | 0.12 | 0.12 | 0.12 | 0.12 | 0.12 |
| Comments: | Base Melt |  |  |  |  |
| Properties: |  |  |  |  |  |
| $n_d$ | 1.533 | 1.534 | 1.536 | 1.536 | 1.541 |
| Sigma | 4.23 | 4.25 | 4.07 | 4.29 | 4.16 |
| lifetime | 292 | 273 | 255 | 248 | 238 |
| density | 2.62 | 2.63 | 2.75 | 2.63 | 2.76 |
| K | 0.85 | 0.82 | 0.81 | 0.83 | .80 |
| CTE 20–40° C. | 76.5 | 76.0 | 69.8 | 72.9 | 67.7 |
| CTE 20–300° C. | 98.4 | 103.4 |  | 104.2 | 91.7 |
| E | 70 | 70 | 70 | 70 | 70 |

TABLE 12

Alkali Variations
Compositions in Mole Percent Oxide

| Oxide/Composition | 1 | 37 | 38 | 39 | 40 | 41 | 42 |
|---|---|---|---|---|---|---|---|
| $P_2O_5$ | 61.27 | 61.27 | 61.27 | 61.27 | 61.27 | 61.27 | 61.27 |
| $Al_2O_3$ | 11.83 | 11.83 | 11.83 | 11.83 | 11.83 | 11.83 | 11.83 |
| $Li_2O$ | 24.59 | 12.30 | 8.27 | 12.30 |  |  |  |
| $Na_2O$ |  | 12.30 | 8.27 |  | 24.59 | 12.30 |  |
| $K_2O$ |  |  | 8.27 | 12.30 |  | 12.30 | 24.59 |
| $Nd_2O_3$ | 1.70 | 1.74 | 1.74 | 1.74 | 1.74 | 1.74 | 1.74 |
| $La_2O_3$ | 0.35 | 0.36 | 0.36 | 0.36 | 0.36 | 0.36 | 0.36 |
| $As_2O_3$ | 0.12 | 0.12 | 0.12 | 0.12 | 0.12 | 0.12 | 0.12 |
| Property |  |  |  |  |  |  |  |
| Refractive Index at 587.5618 nm | 1.533 | 1.528 | 1.523 | 1.523 | 1.518 | 1.515 | 1.511 |
| Cross Section (10-20 cm²) | 4.23 | 4.73 | 4.11 | 4.10 | 4.06 | 4.04 | 4.04 |
| Lifetime (microsec.) | 292 | 315 | 290 | 286 | 330 | 302 | 278 |
| Density (gm/cm³) | 2.62 | 2.34 | 2.67 | 2.64 | 2.68 | 2.66 | 2.63 |
| Thermal Expan. at 20–40° C. ($10^{-7}$/K) | 76.5 | 88.2 | 93.1 | 98.7 | 100.3 | 106.7 | 97.3 |
| Thermal Conductivity at 90° C. (W/mK) | 0.85 | 0.80 | 0.75 | 0.73 | 0.72 | 0.66 | 0.62 |
| Poisson's Ratio | 0.235 | 0.239 | 0.260 | 0.242 | 0.249 | 0.251 | 0.253 |
| Young's Modulus (1000 N/mm²) | 70 | 61 | 62 | 62 | 59 | 56 | 51 |

TABLE 13

| Oxide | 56 | 57 | 58 |
|---|---|---|---|
| $P_2O_5$ | 61.27 | 61.27 | 61.27 |
| $SiO_2$ |  |  |  |
| $B_2O_3$ |  |  |  |
| $Al_2O_3$ | 11.83 | 14.83 | 8.83 |
| $Li_2O$ | 21.59 | 21.59 | 27.59 |
| $Na_2O$ |  |  |  |
| $K_2O$ |  |  |  |
| MgO | 3.00 |  |  |
| CaO |  |  |  |
| SrO |  |  |  |
| BaO |  |  |  |

TABLE 13-continued

| Oxide | 56 | 57 | 58 |
|---|---|---|---|
| ZnO | | | |
| Nd$_2$O$_3$ | 1.74 | 1.74 | 1.74 |
| La$_2$O$_3$ | 0.36 | 0.36 | 0.36 |
| As$_2$O$_3$ | 0.12 | 0.12 | 0.12 |
| Comments: | | | |
| Properties | | | |
| n$_d$ | 1.534 | 1.532 | 1.532 |
| σ | 4.15 | 4.07 | 4.26 |
| τ$_i$ (5%) | 273 | 274 | 263 |
| ρ | 2.62 | 2.61 | 2.61 |
| K | 0.87 | 0.89 | 0.84 |
| υ | 0.235 | 0.234 | 0.242 |
| α$_{20-300}$ | 94.7 | 90.3 | 107.8 |
| α$_{20-40}$ | 80.4 | 72.7 | 90.9 |
| E | 71 | 72 | 66 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A low- or no-silica phosphate glass useful as a laser medium and having a high thermal conductivity, K$_{90°C.}$>0.8 W/mK, and a low coefficient of thermal expansion, α$_{20°-40°C.}$<80×10$^{-7}$/°C., consisting essentially of (on a batch composition basis):

| | Mole % |
|---|---|
| P$_2$O$_5$ | 45–70 |
| Li$_2$O | 15–35 |
| Na$_2$O | 0–10 |
| Al$_2$O$_3$ | 10–15 |
| K$_2$O | 0–3 |
| lasable ion | 0.01–6 |
| La$_2$O$_3$ | 0–6 |
| SiO$_2$ | 0–8 |
| B$_2$O$_3$ | 0–8 |
| MgO | 0–18 |
| CaO | 0–15 |
| SrO | 0–9 |
| BaO | 0–9 |
| ZnO | 0–15 | the amounts of Li$_2$O and Na$_2$O providing an average alkali metal ionic radius sufficiently low whereby said glass has K$_{90°C.}$>0.8 W/mK and α$_{20°-40°C.}$<80×10$^{-7}$/°C., and wherein, when the batch composition is melted in contact with a silica-containing surface, the final glass composition contains at most about 3.5 mole % of additional silica derived from such contact during melting.

2. A glass of claim 1, wherein said lasable ion is a lanthanide.

3. A glass of claim 2, wherein an amount of La$_2$O$_3$ replaces a portion of said amount of said lasable ion.

4. A glass of claim 2, wherein said lasable ion is Nd.

5. A glass of claim 4, consisting essentially of (on a batch composition basis)

| | Mole % |
|---|---|
| P$_2$O$_5$ | 45–70 |
| Li$_2$O | 15–35 |
| Na$_2$O | 0–6 |
| K$_2$O | 0 |
| Al$_2$O$_3$ | 10–15 |
| Nd$_2$O$_3$ | 0.01–6 |
| La$_2$O$_3$ | 0–6 |
| SiO$_2$ | 0 |
| B$_2$O$_3$ | 0–8 |
| MgO | 0–18 |
| CaO | 0–15 |
| SrO | 0–9 |
| BaO | 0–9 |
| ZnO | 0–15. |

6. A class of claim 4, consisting essentially of (on a batch composition basis)

| | Mole % |
|---|---|
| P$_2$O$_5$ | 50–65 |
| Li$_2$O | 15–30 |
| Na$_2$O | 0–5 |
| K$_2$O | 0 |
| Al$_2$O$_3$ | 10–15 |
| Nd$_2$O$_3$ | 0.01–6 |
| La$_2$O$_3$ | 0–6 |
| SiO$_2$ | 0 |
| B$_2$O$_3$ | 0–5 |
| MgO | 0–12 |
| CaO | 0–12 |
| SrO | 0–6 |
| BaO | 0–6 |
| ZnO | 0–12. |

7. A glass of claim 4, consisting essentially of (on a batch composition basis)

| | Mole % |
|---|---|
| P$_2$O$_5$ | 55–65 |
| Li$_2$O | 18–30 |
| Na$_2$O | 0 |
| K$_2$O | 0 |
| Al$_2$O$_3$ | 10–15 |
| Nd$_2$O$_3$ | 0.01–6 |
| La$_2$O$_3$ | 0–6 |
| SiO$_2$ | 0 |
| B$_2$O$_3$ | 0 |
| MgO | 0–9 |
| CaO | 0–9 |
| SrO | 0–4 |
| BaO | 0–4 |
| ZnO | 0–9. |

8. A glass of claim 5, wherein K$_{90°C.}$≧0.85 and α$_{20°-40°C.}$<77.

9. A glass of claim 5, wherein the content of MgO is 4–15 mole %.

10. A glass of claim 1 further containing an effective amount of a refining agent or another batch component effective as a solarization inhibitor, excluding SiO$_2$.

11. A glass of claim 1, wherein the content of MgO is 4–15 mole %.

12. A glass of claim 1 containing essentially no alkali metal oxides other than Li$_2$O.

13. A glass of claim 5 containing essentially no alkali metal oxides other than Li$_2$O.

14. A glass of claim 6 containing essentially no alkali metal oxides other than Li$_2$O.

15. A glass of claim 1, wherein said lasable ion is Tm, Yb, Dy, Pm, Tb, Er, Ho, Ti, V, Cr, Eu, or Sm.

16. A glass of claim 1 which further contains an amount of a transition metal or lanthanide dopant ion effective to transfer energy to said lasing ion.

17. In a laser comprising a cavity having an active glass component and reflective end surfaces, the improvement wherein said glass is one of claim 1.

18. A laser of claim 17, wherein said active glass component is chemically strengthened by ion exchange.

19. A low- or no-silica phosphate glass useful as a laser medium and having a high thermal conductivity, $K_{90°\ C.}>0.8$ W/mK, and a low coefficient of thermal expansion, $\alpha_{20°-40°\ C.}<80\times 10^{-7}/°C.$, consisting essentially of (on a batch composition basis):

|  | Mole % |
| --- | --- |
| $P_2O_5$ | 45–70 |
| $Li_2O$ | 15–35 |
| $Na_2O$ | 0–10 |
| $K_2O$ | 0 |
| $Al_2O_3$ | 10–15 |
| lasing ion | 0–6 |
| $La_2O_3$ | 0–6 |
| $SiO_2$ | 0 |
| $B_2O_3$ | 0–8 |
| MgO | 0–18 |
| CaO | 0–15 |
| SrO | 0–9 |
| BaO | 0–9 |
| ZnO | 0–15 | the amounts of $Li_2O$ and $Na_2O$ providing an average alkali metal ionic radius sufficiently low whereby said glass has $K_{90°\ C.}>0.8$ W/mK and $\alpha_{20°-40°\ C.}<80\times 10^{-7}/°C.$, and wherein, when the batch composition is melted in contact with a silica-containing surface, the final glass composition contains at most about 3.5 mole % of additional silica derived from such contact during melting.

20. A glass of claim 1 containing essentially no $SiO_2$ in the batch composition and up to 3 mole % $SiO_2$ in the final glass composition.

21. A glass of claim 1 containing essentially no $SiO_2$ in the batch composition and up to 2 mole % $SiO_2$ in the final glass composition.

22. A glass of claim 1, melted in a non-$SiO_2$ containing crucible.

23. A glass of claim 1, having the following properties:

| Damaging inclusions per liter | essentially zero |
| --- | --- |
| Strengthenability | $\geq 4$ x |
| Young's Modulus (E) | $<72\times 10^3$ N/mm$^2$ |
| Poisson's Ratio ($\nu$) | $<0.230$ |
| Cross section ($\sigma$) | $>3.5\times 10^{-20}$ cm$^2$ |
| Fluorescence lifetime (5% Nd) | $>250$ μsec. |

* * * * *

UNITED STATES PATENT AND TRADEMARK OFFICE
CERTIFICATE OF CORRECTION

PATENT NO. : 4,929,387

DATED : May 29, 1990

INVENTOR(S) : JOSEPH S. HAYDEN ET AL

It is certified that error appears in the above-identified patent and that said Letters Patent is hereby corrected as shown below:

Column 15, claim 1, line 43:

reads " $SiO_2$      0-8"

should read -- $SiO_2$      0 --

Column 17, claim 19, line 23:

reads " $K_2O$      0"

should read -- $K_2O$      0-3 --

Signed and Sealed this

Third Day of September, 1991

Attest:

HARRY F. MANBECK, JR.

Attesting Officer

Commissioner of Patents and Trademarks